(12) United States Patent
Kumar

(10) Patent No.: US 12,279,337 B2
(45) Date of Patent: Apr. 15, 2025

(54) METHOD, UE AND NETWORK APPARATUS TO HANDLE SERVICE REQUEST PROCEDURE IN WIRELESS NETWORK

(71) Applicant: Samsung Electronics Co., Ltd., Suwon-si (KR)

(72) Inventor: Lalith Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/728,451

(22) Filed: Apr. 25, 2022

(65) Prior Publication Data
US 2022/0345875 A1  Oct. 27, 2022

(30) Foreign Application Priority Data

Apr. 26, 2021 (IN) .............................. 202141019176
Mar. 23, 2022 (IN) .............................. 2021 41019176

(51) Int. Cl.
*H04W 76/30* (2018.01)
*H04W 8/18* (2009.01)
*H04W 60/06* (2009.01)

(52) U.S. Cl.
CPC ........... *H04W 8/183* (2013.01); *H04W 60/06* (2013.01); *H04W 76/30* (2018.02)

(58) Field of Classification Search
CPC ...... H04W 8/183; H04W 60/06; H04W 76/30
See application file for complete search history.

(56) References Cited

U.S. PATENT DOCUMENTS 11,838,887 B2 * 12/2023 Liong ................... H04W 48/02
2017/0105236 A1 * 4/2017 Chandramouli ...... H04W 76/10
(Continued)

FOREIGN PATENT DOCUMENTS

WO  2020/137238 A1  7/2020
WO  2020/225160 A1  11/2020
(Continued)

OTHER PUBLICATIONS

Indian Office Action dated Dec. 14, 2022, issued in Indian Patent Application No. 202141019176.
(Continued)

*Primary Examiner* — Fahmida S Chowdhury
(74) *Attorney, Agent, or Firm* — Jefferson IP Law, LLP

(57) ABSTRACT

The disclosure relates to a 5G or 6G communication system for supporting a higher data transmission rate.
A method for handling Service Request (SR) procedure in a wireless network by a network apparatus is provided. The method includes initiating a User Equipment Configuration Update (UCU) procedure. Further, the method includes receiving a SR message from a Multi SIM (MUSIM) UE before completion of the UCU procedure. Further, the method includes determining whether the SR message comprises a User Equipment (UE) request type Information Element (IE) set to "Non-Access Stratum (NAS) signaling connection release". In an embodiment, the method includes aborting the UCU procedure and processing the SR procedure in response to determining that the service request message comprises the UE request type IE set to "NAS signaling connection release". In another embodiment, the method includes processing both the UCU procedure and the SR procedure in response to determining that the SR message does not comprises the UE request type IE set to "NAS signaling connection release".

14 Claims, 9 Drawing Sheets

(56) References Cited

U.S. PATENT DOCUMENTS

| | | | |
|---|---|---|---|
| 2019/0297593 A1* | 9/2019 | Niemi | H04W 8/02 |
| 2020/0008167 A1 | 1/2020 | Venkataraman et al. | |
| 2020/0145211 A1* | 5/2020 | Lee | H04L 9/0825 |
| 2020/0323020 A1* | 10/2020 | Liu | H04L 67/14 |
| 2021/0105837 A1* | 4/2021 | Lee | H04W 8/26 |
| 2021/0105866 A1 | 4/2021 | Kavuri et al. | |
| 2021/0211870 A1* | 7/2021 | Perras | H04W 4/70 |
| 2021/0226850 A1* | 7/2021 | Xu | H04W 4/50 |
| 2021/0235266 A1* | 7/2021 | Starsinic | H04W 8/205 |
| 2022/0053448 A1* | 2/2022 | Velev | H04W 8/183 |
| 2022/0295279 A1* | 9/2022 | Kuge | H04W 12/08 |
| 2022/0329983 A1* | 10/2022 | Jeong | H04W 12/06 |
| 2023/0034349 A1* | 2/2023 | Mladin | H04W 4/40 |
| 2023/0156653 A1* | 5/2023 | Wass | H04W 76/30 455/435.1 |
| 2023/0209327 A1* | 6/2023 | Speicher | H04W 8/12 370/329 |

FOREIGN PATENT DOCUMENTS

| | | |
|---|---|---|
| WO | 2021/033975 A1 | 2/2021 |
| WO | 2021/043417 A1 | 3/2021 |
| WO | 2021/069163 A1 | 4/2021 |

OTHER PUBLICATIONS

Extended European Search Report dated Jul. 24, 2024, issued in European Patent Application No. 22796072.1.
Apple Inc., R2-2103831, Signaling aspects of Musim Network Switching, Apr. 2, 2021.
International Search Report dated Jul. 26, 2022, issued in International Patent Application No. PCT/KR2022/005871.

* cited by examiner

METHOD, UE AND NETWORK APPARATUS TO HANDLE SERVICE REQUEST PROCEDURE IN WIRELESS NETWORK

CROSS-REFERENCE TO RELATED APPLICATION(S)

This application is based on and claims priority under 35 U.S.C. § 119(a) of an Indian Provisional patent application Serial number 202141019176, filed on Apr. 26, 2021, in the Indian Intellectual Property Office, and of an Indian Complete patent application Serial number 202141019176, filed on Mar. 23, 2022, in the Indian Intellectual Property Office, the disclosure of each of which is incorporated by reference herein in its entirety.

BACKGROUND

1. Field

The disclosure relates to a wireless network. More particularly, the disclosure relates to a method, a network apparatus and a user equipment (UE) to handle Service Request (SR) procedure in the wireless network.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In general, a User Equipment (UE) with multiple User Subscriber Identity Modules (USIMs), capable of maintaining a separate registration state with a Public Land Mobile Network (PLMN) for each USIM at least over a 3$^{rd}$ Generation Partnership Project (3GPP) Access and supporting one or more of the enhancements described in the 3GPP. A network and the UE may support one or more of the following enhancements for the Multi-USIM UE operation.

a) Connection release,
b) Paging indication for voice service,
c) Reject paging request, and
d) Paging Restriction.

In a registration procedure, the Multi-USIM UE may include the Multi-USIM mode indication (or an individual capability bit) to an Access and Mobility Management Function (AMF) entity, if it has more than one USIM active and intends to use Multi-USIM specific features. Based on the received Multi-USIM mode indication (or the capability) from the UE, the AMF entity shall indicate to the UE the supported Multi-USIM features by the wireless network.

When accessing a core network, the Multi-USIM UE may request the wireless network to be released from a connection management CONNECTED (CM-CONNECTED) state due to activity on another USIM.

The UE indicates that it requests to be released from the CM-CONNECTED state, by initiating either a Service Request procedure or a registration procedure (in case the UE needs to perform registration update at the same time with the wireless network), including a release indication. If supported by the UE, the UE may also provide, only together with the release indication, a paging restriction information, which requests the wireless network to restrict paging. The paging restriction information from the UE is stored in the UE context in the AMF entity. If no paging restriction information is provided in the service request or the registration request, any stored paging restriction information in the UE context is removed.

When the UE initiates a service request procedure or registration procedure without providing a release indication (also called as release request indication), the wireless network removes any stored paging restriction information.

Based on activity ongoing on another USIM, the Multi-USIM UE may respond to a page with a reject paging indication (also called as release request indication or release indication) to the wireless network indicating that the UE does not accept the paging and requests to return to the CM-IDLE state after transmitting this response.

Upon being paged by the wireless network, the Multi-USIM UE in the CM-IDLE state attempts to transmit a service request message to the wireless network including the reject paging indication, unless it is unable to do so, e.g., due to the UE implementation constraints. In addition to the reject paging indication, the UE may include paging restriction information in the service request message, if supported by the UE.

FIG. 1 illustrating a scenario of service request and de-registration procedure collision, according to the related art.

Referring to FIG. 1, consider methods and systems of the related art, if the Multi SIM (MUSIM) UE 100 receives a DEREGISTRATION REQUEST message from the wireless network in state 5GMM-SERVICE-REQUEST-INITIATED, the MUSIM UE 100 shall progress the DEREGISTRATION REQUEST message and the service request procedure shall be aborted. This collision case is valid if the DEREGISTRATION REQUEST message indicates the access type over which the service request procedure is attempted otherwise both the procedures are progressed, as follows:

At operation S101, i) MUSIM capable UE's first UE (belonging to first SIM) is in Connected Mode, ii) MUSIM UE 100 wants to initiate operation on the second MI and iii) First UE transmits Service Request (SR) with release flag. Requesting network to release the connection.

At operation S102, an AMF entity 300 decides to transmit network initiated deregister message to the MUSIM UE 100. At operation S103, the MUSIM UE 100 transmits the service request message (with release flag) to the g-NodeB 200. At operation S104, the AMF entity 300 initiates the deregistration procedure to the g-NodeB 200. At operation S105, there is a collision between the deregistration procedure and the service request message. At operation S106, as per current standard network and the UE will proceed with a deregister procedure. The MUSIM UE 100 will end up spending more time on the first SIM which will impact the service on the second SIM.

In other words, the network and the UE of the related art will proceed with a deregister procedure. The UE will end up spending more time on the first SIM which will impact the service on second SIM, if the DEREGISTRATION REQUEST message indicates the same access type over which the service request procedure is attempted Otherwise, both service request procedure and deregistration procedure procedures are progressed which will also create a delay in the release of non-access stratum (NAS) signaling connection and impact the pending service on second UE.

FIG. 2 illustrating a scenario of collision between service request and network initiated NAS procedure, according to the related art.

Referring to FIG. 2, consider methods and systems of the related art, the service request and identification procedure/DL NAS TRANSPORT/UE configuration update procedure/Network slice-specific authentication and authorization procedure is as follows:

At operation S201, i) (MUSIM capable UE's first UE (belonging to first SIM) is in the connected mode, ii) the MUSIM UE 100 wants to initiate operation on the second SIM, iii) First UE transmits SR with release flag. At operation S202, requesting network to release the connection and now if meanwhile UE receives Identify request message or DL NAS transport message or CONFIGURATION UPDATE COMMAND message or NETWORK SLICE-SPECIFIC AUTHENTICATION COMMAND message for processing.

At operation S203, the MUSIM UE 100 transmits the service request message (with release flag) to the AMF. At operation S204, at the same or similar time the AMF entity 300 transmits the identity request message, or DL NAS TRANSPORT message or UE configuration update or network slice-specific authentication command towards the UE. At operation S205, there is collision between the network initiated NAS procedure and the service request procedure. At operation S206, as per current standard network will proceed with network initiated NAS procedure. The MUSIM UE 100 will end up spending more time on the first SIM to execute the network initiated NAS procedure which will impact the pending service on the second SIM.

In summary, when the UE initiates the SR procedure with release request flag, the UE is expecting to get the RRC connection released as soon as possible. Once the RRC connection is released, the UE may initiate the service on another SIM. But, if in meanwhile network initiates a NAS procedure then, as per the related art, the UE will end up executing the NAS procedure. This is because the network would not release the RRC connection till the NAS procedure is completely executed, as the UE ends up executing the new initiated NAS procedure, which in turn may require new procedures to be executed. This may substantially delay the start of the service on the second SIM, for example if it was mobile terminated call pending on the second SIM it may get dropped or any other critical service then delay in execution of such service is not acceptable. Thus, it is desired to address the above-mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method, a UE and a network apparatus for handling a SR procedure in a wireless network.

Another aspect of the disclosure is to provide that the network apparatus initiates a generic UE configuration update (UCU) procedure. Further, the network apparatus receives a service request message before completion of the UCU procedure, i.e., before the UCU response. If the service request message includes a UE request type set to "NAS signaling connection release" the UCU procedure is aborted and a service request procedure is progressed. If the service request message does not include the UE request type set to "NAS signaling connection release" both UCU and service request procedure progresses.

Another aspect of the disclosure is to provide that the UE transmits a service request message with a UE request type set to "NAS signaling connection release". If the UE receives a UE configuration update command, before completion of a service request procedure, i.e., before service accept message is received from the network apparatus. The UE aborts the UE configuration update procedure by ignoring the (configuration update command) UCU message and progresses the service request procedure, if the service request message includes a UE request type set to "NAS signaling connection release". If the UE has not included a UE request type set to "NAS signaling connection release" both service request and the UCU procedures progresses.

Additional aspects will be set forth in part in the description which follows and, in part, will be apparent from the description, or may be learned by practice of the presented embodiments.

In accordance with an aspect of the disclosure, a method for handling a SR procedure in a wireless network is provided. The method includes initiating, by a network apparatus in the wireless network, a UE Configuration Update (UCU) procedure. Further, the method includes receiving, by the network apparatus, a SR message from a Multi SIM (MUSIM) UE before completion of the UCU procedure. Further, the method includes determining, by the network apparatus, whether the SR message comprises a UE request type Information Element (IE) set to "NAS signaling connection release". In an embodiment, the method includes aborting the UCU procedure and processing the SR procedure in response to determining that the service request message comprises the UE request type IE set to "NAS signaling connection release". In another embodiment, the method includes processing both the UCU procedure and the SR procedure in response to determining that the SR message does not comprises the UE request type IE set to "NAS signaling connection release". Progressing both the procedures means network will transmit the Service accept message to the UE and at the same time the UE will transmit CONFIGURATION UPDATE COMPLETE (UCU response) message to the network without any dependency between SR and UCU procedure.

In accordance with another aspect of the disclosure, a method for handling SR procedure in a wireless network is provided. The method includes initiating, by a MUSIM UE, the SR procedure. The method further includes transmitting, by the MUSIM UE, a SR message by including or not including UE request type IE set to "NAS signaling connection release" to a network apparatus in the wireless network. Further, the method includes receiving, by the MUSIM UE, a UE configuration update (UCU) message from the network apparatus before completion of the SR procedure. In an embodiment, the method includes aborting a UE configuration update procedure by ignoring the UCU message received from the network apparatus and progressing the SR procedure, when the SR message includes the UE request type IE set to "NAS signaling connection release". In an embodiment, the method includes processing both the UCU procedure and the SR procedure in response when the SR message does not comprise the UE request type IE set to "NAS signaling connection release".

In this embodiment, a collision is detected by the UE and AMF, the UE detects a collision because it has not received the response of the uplink NAS message for example the UE has transmitted service request message and not received service accept message however the UE has received another network initiated NAS message like configuration update command. At the same time, the network identifies the collision if it has not received the response of a downlink NAS message (e.g. configuration update complete) AMF has transmitted, but it has received another uplink NAS message like service request message.

In accordance with another aspect of the disclosure, a network apparatus for handling SR procedure in a wireless network is provided. The network apparatus includes a SR procedure controller communicatively connected to a memory and a processor. The SR procedure controller is configured to initiate a UCU procedure and receive a SR message from a MUSIM UE before completion of the UCU procedure. Further, the SR procedure controller is configured to determine whether the SR message comprises a UE request type IE set to "NAS signaling connection release". In an embodiment, the SR procedure controller is configured to abort the UCU procedure and process the SR procedure in response to determining that the service request message comprises the UE request type IE set to "NAS signaling connection release". In another embodiment, the SR procedure controller is configured to process both the UCU procedure and the SR procedure in response to determining that the SR message does not comprises the UE request type IE set to "NAS signaling connection release".

In accordance with another aspect of the disclosure, a MUSIM UE for handling SR procedure in a wireless network is provided. The MUSIM UE includes a SR procedure controller communicatively connected to a memory and a processor. The SR procedure controller is configured to initiate the SR procedure and transmit a SR message by including or not including UE request type IE set to "NAS signaling connection release" to a network apparatus in the wireless network. Further, the SR procedure controller is configured to receive a UCU message from the network apparatus before completion of the SR procedure. In an embodiment, the SR procedure controller is configured to abort a UE configuration update procedure by ignoring the UCU message received from the network apparatus and progress the SR procedure, when the SR message includes the UE request type IE set to "NAS signaling connection release". In another embodiment, the SR procedure controller is configured to process both the UCU procedure and the SR procedure in response when the SR message does not comprise the UE request type IE set to "NAS signaling connection release".

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
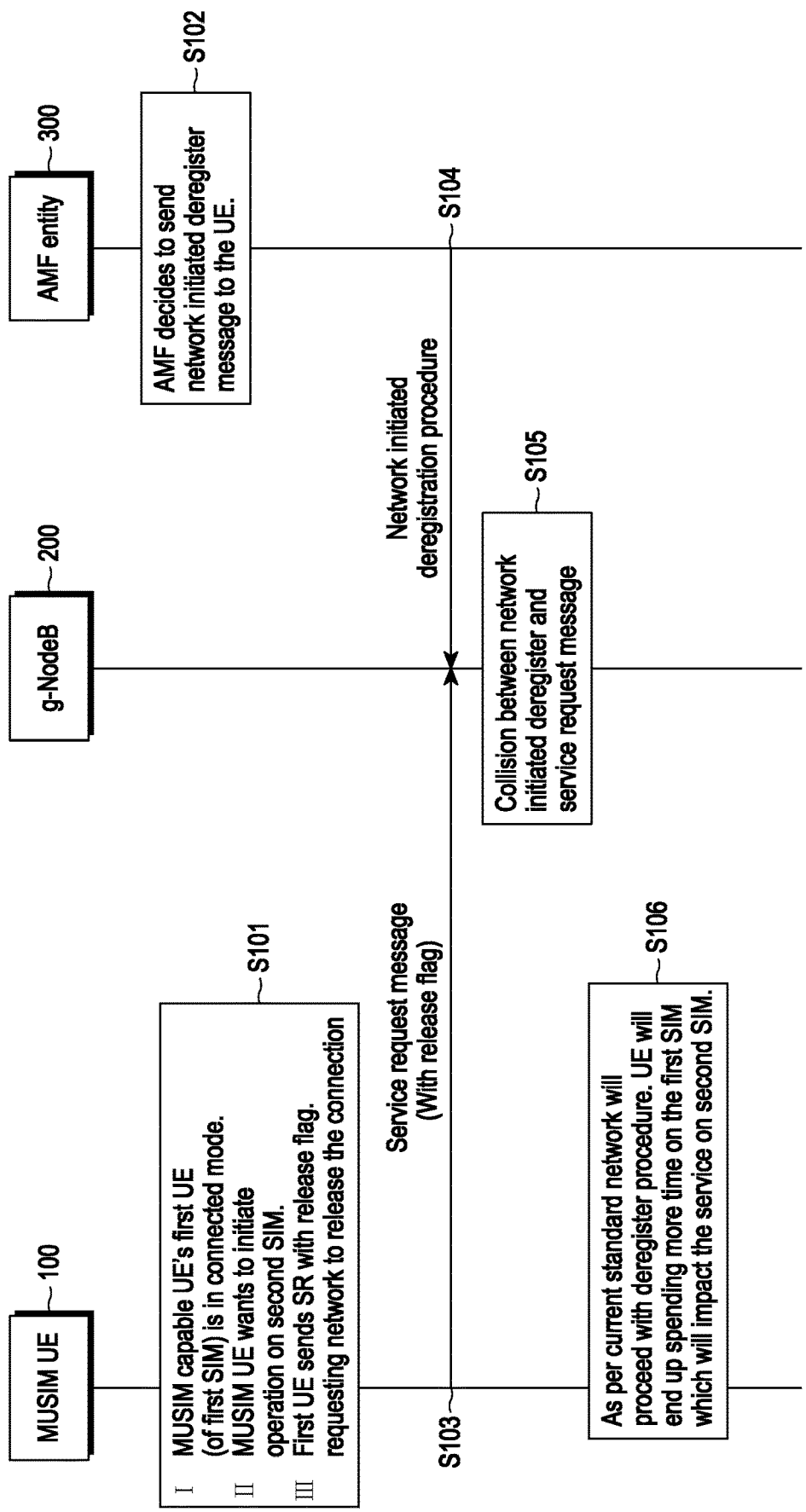
FIG. 1 is an example scenario in which a service request and de-registration procedure collision is depicted, according to the related art.
Figure 2:
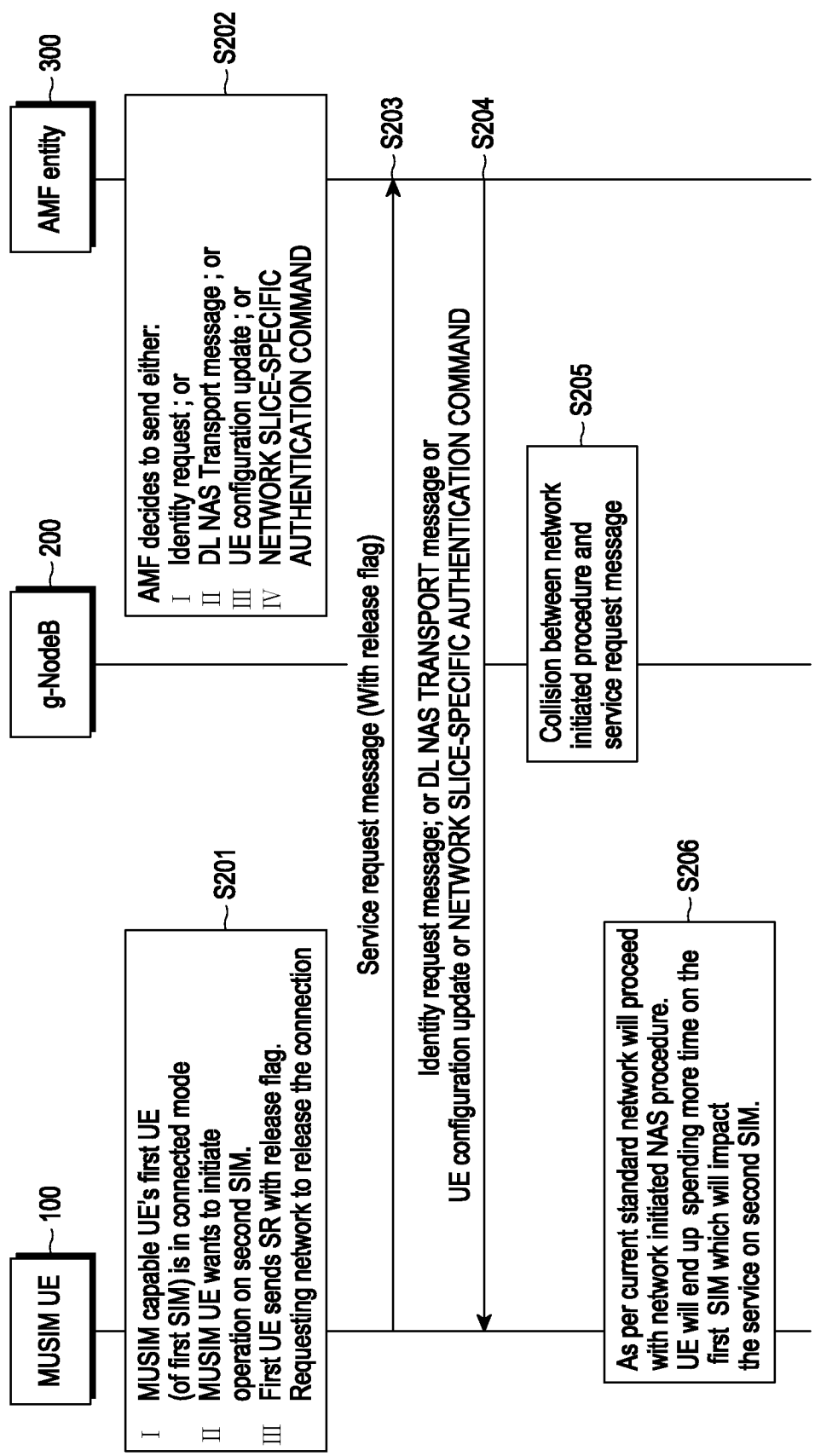
FIG. 2 is an example scenario in which a service request and identification procedure is depicted, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to provide a method for handling an SR procedure in a wireless network. The method includes initiating, by a network apparatus in the wireless network, a UCU procedure. Further, the method includes receiving, by the network apparatus, an SR message from a Multi SIM (MUSIM) UE before completion of the UCU procedure. Further, the method includes determining, by the network apparatus, whether the SR message comprises a UE request type IE set to "NAS signaling connection release". In an embodiment, the method includes aborting the UCU procedure and processing the SR procedure in response to determining that the service request message comprises the UE request type IE set to "NAS signaling connection release". In another embodiment, the method includes processing both the UCU procedure and the SR procedure in response to determining that the SR message does not comprises the UE request type IE set to "NAS signaling connection release".

In an embodiment, the UE transmits service request with UE request type set to "NAS signaling connection release". IF the UE receives UE configuration update command, before completion of service request procedure i.e., before service accept message is received from the network apparatus. The UE aborts the UE configuration update procedure by ignoring the UCU message and progresses the Service request procedure, if the service request includes UE request type set to "NAS signaling connection release". If the UE has not included UE request type set to "NAS signaling connection release" both service request and UCU procedures are progressed.

The terms UCU message, CONFIGURATION UPDATE COMMAND message, and UE configuration update message are used interchangeable and have same meaning.

The terms Release request, release flag, release, UE request type IE set to "NAS signaling connection release" are used interchangeable and have same meaning. This flag is used by the UE in service request or registration request message to request network to release the UE to IDLE or RRC Inactive state.

The terms UCU procedure and generic UE configuration update procedure are used interchangeably and have same meaning.

Referring now to the drawings and more particularly to FIGS. 3 through 10, where similar reference characters denote corresponding features consistently throughout the figures, there are shown preferred embodiments.

Figure 3:
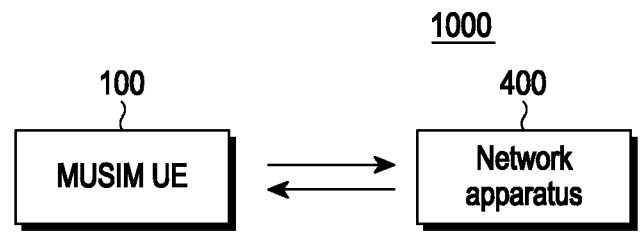
FIG. 3 illustrates an overview of a network apparatus, according to an embodiment of the disclosure.

FIG. 3 illustrates an overview of a wireless network, according to an embodiment of the disclosure.

Referring to FIG. 3, a wireless network 1000 includes a MUSIM UE 100 and a network apparatus 400. The wireless network 1000 may be, for example, but not limited to a $5^{th}$ wireless network, 6G network, an ORAN or the like. The MUSIM UE 100 can be, for example, but not limited to a laptop, a desktop computer, a notebook, a relay device, a Device-to-Device (D2D) device, a vehicle to everything (V2X) device, a smartphone, a tablet, an immersive device, or an internet of things (IoT) device.

The MUSIM UE 100 is configured to initiate the SR procedure and transmit an SR message by including or not including a UE request type IE set to "NAS signaling connection release" to the network apparatus 400 in the wireless network 1000. Further, the MUSIM UE 100 is configured to receive the UCU message from the network apparatus 400 before completion of the SR procedure. In an embodiment, the MUSIM UE 100 is configured to abort a UE configuration update procedure by ignoring the UCU message received from the network apparatus 400 and progress the SR procedure, when the SR message includes the UE request type IE set to "NAS signaling connection release". In another embodiment, the MUSIM UE 100 is configured to process both the UCU procedure and the SR procedure in response to when the SR message does not comprise the UE request type IE set to "NAS signaling connection release".

In an embodiment, the network apparatus 400 is configured to initiate a UCU procedure and receive an SR message from the MUSIM UE 100 before completion of the UCU procedure. Further, the network apparatus 400 is configured to determine whether the SR message comprises a UE request type IE set to "NAS signaling connection release". In response to determining that the service request message comprises the UE request type IE set to "NAS signaling connection release", the network apparatus 400 is configured to abort the UCU procedure and process the SR procedure. In response to determining that the SR message does not comprises the UE request type IE set to "NAS signaling connection release", the network apparatus 400 is configured to process both the UCU procedure and the SR procedure.

The first UE of the MUSIM UE 100 transmits a NAS message to the network apparatus 400 by including a release request flag to indicate to the network apparatus 400 that it wants to release the signaling connection and get into either INACTIVE state or IDLE state so that the MUSIM UE 100 initiates operation on the second SIM.

In the proposed method all the description is provided with the NAS message for e.g., service request message (with release request flag) as a description but same disclosure holds good when the MUSIM UE 100 has initiated service request message without release request flag.

In the proposed method all the description explains taking the NAS message, service request message as an example. Same is applied to all other UE initiated NAS procedures too unless explicitly mentioned for any particular NAS message name.

All the description provided here is from the perspective of 5GS but same disclosure is equally applicable for an Evolved Packet System (EPS) case core network node is a Mobility Management Entity (MME) instead of an Access and Mobility Management Function (AMF).

In this document, the first UE of MUSIM UE 100 is assumed to initiate service request in connected mode (or connected state) is only for illustration but the disclosure is equally applicable for first UE in the IDLE or INACTIVE state.

Figure 4:
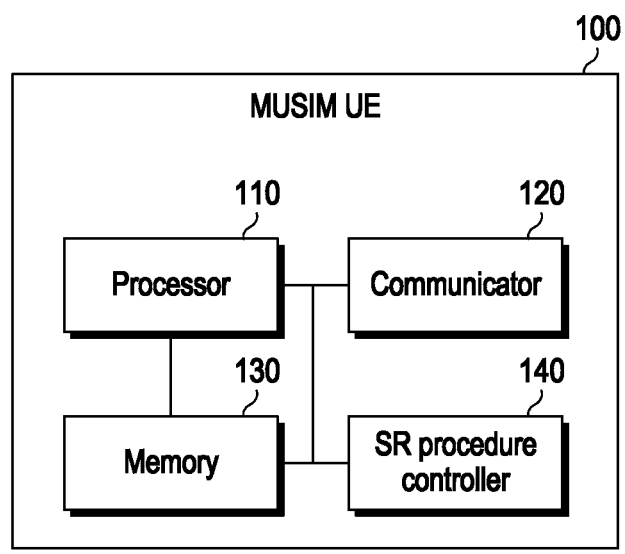
FIG. 4 illustrates various hardware components of a network apparatus, according to an embodiment of the disclosure.

FIG. 4 illustrates various hardware components of a MUSIM UE, according to an embodiment of the disclosure.

Referring to FIG. 4, the MUSIM UE 100 includes a processor 110, a communicator 120 (transceiver), a memory 130, and an SR procedure controller 140. The processor 110 is coupled with the communicator 120, the memory 130, and the SR procedure controller 140.

The SR procedure controller 140 is configured to initiate the SR procedure and transmit the SR message by including or not including the UE request type IE set to "NAS signaling connection release" to the network apparatus 400 in the wireless network 1000. Further, the SR procedure controller 140 is configured to receive the UCU message from the network apparatus 400 before completion of the SR procedure. In an embodiment, the SR procedure controller 140 is configured to abort a UE configuration update procedure by ignoring the UCU message received from the network apparatus 400 and progress the SR procedure, when the SR message includes the UE request type IE set to "NAS signaling connection release". In another embodiment, the SR procedure controller 140 is configured to process both the UCU procedure and the SR procedure in response when the SR message does not comprise the UE request type IE set to "NAS signaling connection release".

The SR procedure controller 140 is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor 110 is configured to execute instructions stored in the memory 130 and to perform various processes. The communicator 120 is configured for communicating internally between internal hardware components and with external devices via one or more networks. The memory 130 also stores instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In certain examples, a non-transitory storage medium may store data that may, over time, change (e.g., in Random Access Memory (RAM) or cache).

Although the FIG. 4 shows various hardware components of the MUSIM UE 100 but it is to be understood that other embodiments are not limited thereon. In other embodiments, the MUSIM UE 100 may include lessor or greater number of components. Further, the labels or names of the components are used only for illustrative purpose and does not limit the scope of the disclosure. One or more components can be combined together to perform same or substantially similar function in the MUSIM UE 100.

Figure 5:
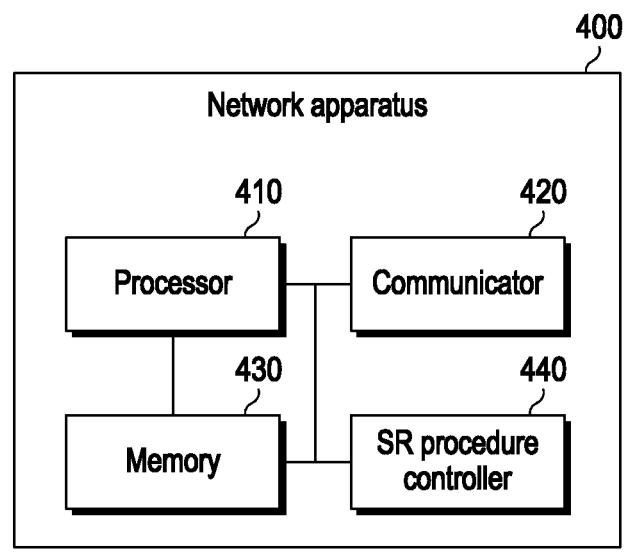
FIG. 5 illustrates various hardware components of a MUSIM UE, according to an embodiment of the disclosure.

FIG. 5 illustrates various hardware components of a network apparatus, according to an embodiment of the disclosure.

Referring to FIG. 5, the network apparatus 400 includes a processor 410, a communicator 420 (transceiver), a memory 430, and an SR procedure controller 440. The processor 410 is coupled with the communicator 420, the memory 430, and the SR procedure controller 440.

The SR procedure controller 440 is configured to initiate a UCU procedure and receive an SR message from the MUSIM UE 100 before completion of the UCU procedure. Further, the SR procedure controller 440 is configured to determine whether the SR message comprises a UE request type IE set to "NAS signaling connection release". In response to determining that the service request message comprises the UE request type IE set to "NAS signaling connection release", the SR procedure controller 440 is configured to abort the UCU procedure and process the SR procedure. In response to determining that the SR message does not comprises the UE request type IE set to "NAS signaling connection release", the SR procedure controller 440 is configured to process both the UCU procedure and the SR procedure.

The SR procedure controller 440 is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor 410 is configured to execute instructions stored in the memory 430 and to perform various processes. The communicator 420 is configured for communicating internally between internal hardware components and with external devices via one or more networks. The memory 430 also stores instructions to be executed by the processor 410. The memory 430 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 430 may, in some examples, be considered a non-transitory storage medium. The term "non-transitory" may indicate that the storage medium is not embodied in a carrier wave or a propagated signal. However, the term "non-transitory" should not be interpreted that the memory 430 is non-movable. In certain examples, a non-transitory storage medium may store data that can, over time, change (e.g., in Random Access Memory (RAM) or cache).

Although the FIG. 5 shows various hardware components of the network apparatus 400 but it is to be understood that other embodiments are not limited thereon. In other embodiments, the network apparatus 400 may include lessor or greater number of components. Further, the labels or names of the components are used only for illustrative purpose and does not limit the scope of the disclosure. One or more components can be combined together to perform same or substantially similar function in the network apparatus 400.

Figure 6:
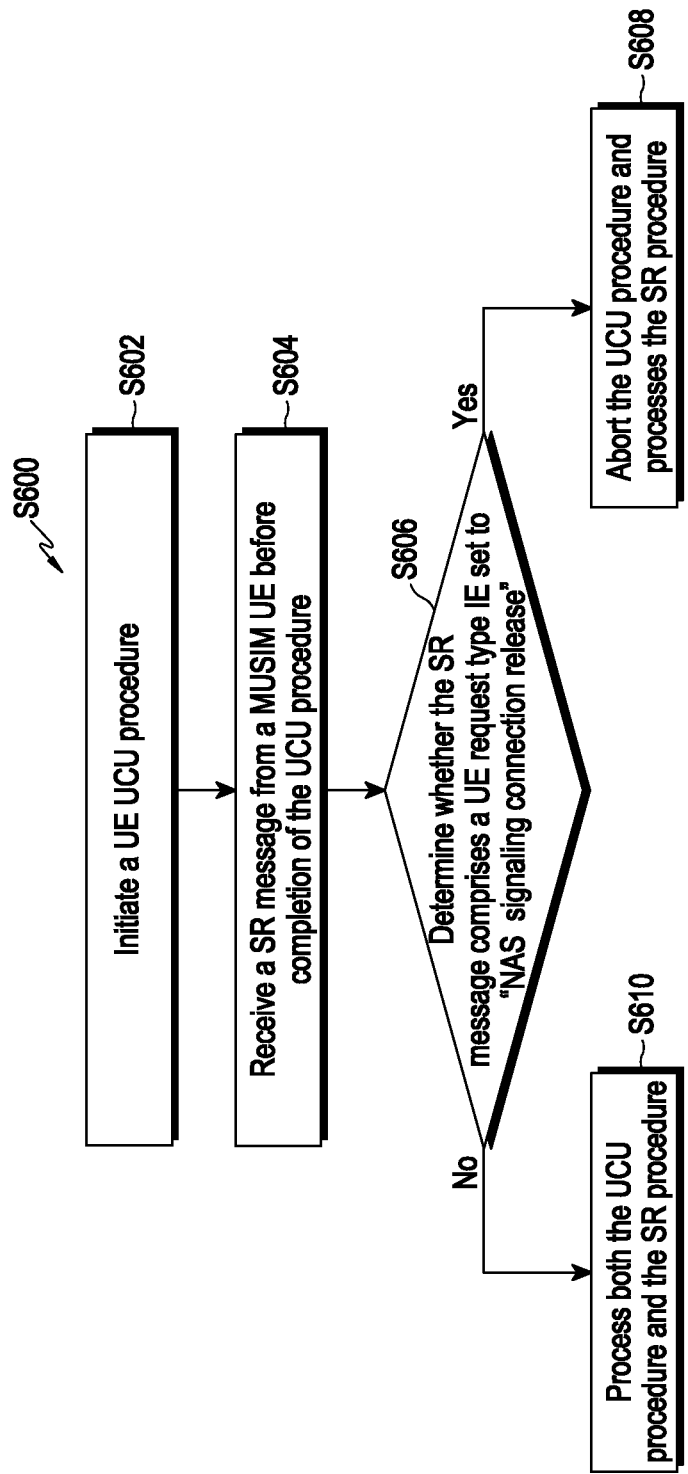
FIG. 6 is a flow chart illustrating a method, implemented by a network apparatus, for handling an SR procedure in a wireless network, according to an embodiment of the disclosure.

FIG. 6 is a flow chart illustrating a method, implemented by a network apparatus, for handling SR procedure in a wireless network, according to an embodiment of the disclosure.

Referring to FIG. 6, in a method S600, operations S602-S610 are handled by the SR procedure controller 240.

At operation S602, the method includes initiating the UE UCU procedure. At operation S604, the method includes receiving the SR message from the MUSIM UE 100 before completion of the UCU procedure. At operation S606, the method includes determining whether the SR message comprises the UE request type IE set to "NAS signaling connection release". In response to determining that the SR message comprises the UE request type IE set to "NAS signaling connection release" then, a S608, the method includes aborting the UCU procedure and processes the SR procedure.

Determine whether the SR message comprises a UE request type IE set to "NAS signaling connection release" In response to determining that the SR message does not comprise the UE request type IE set to "NAS signaling connection release", At operation S610, the method includes Process both the UCU procedure and the SR procedure.

Figure 7:
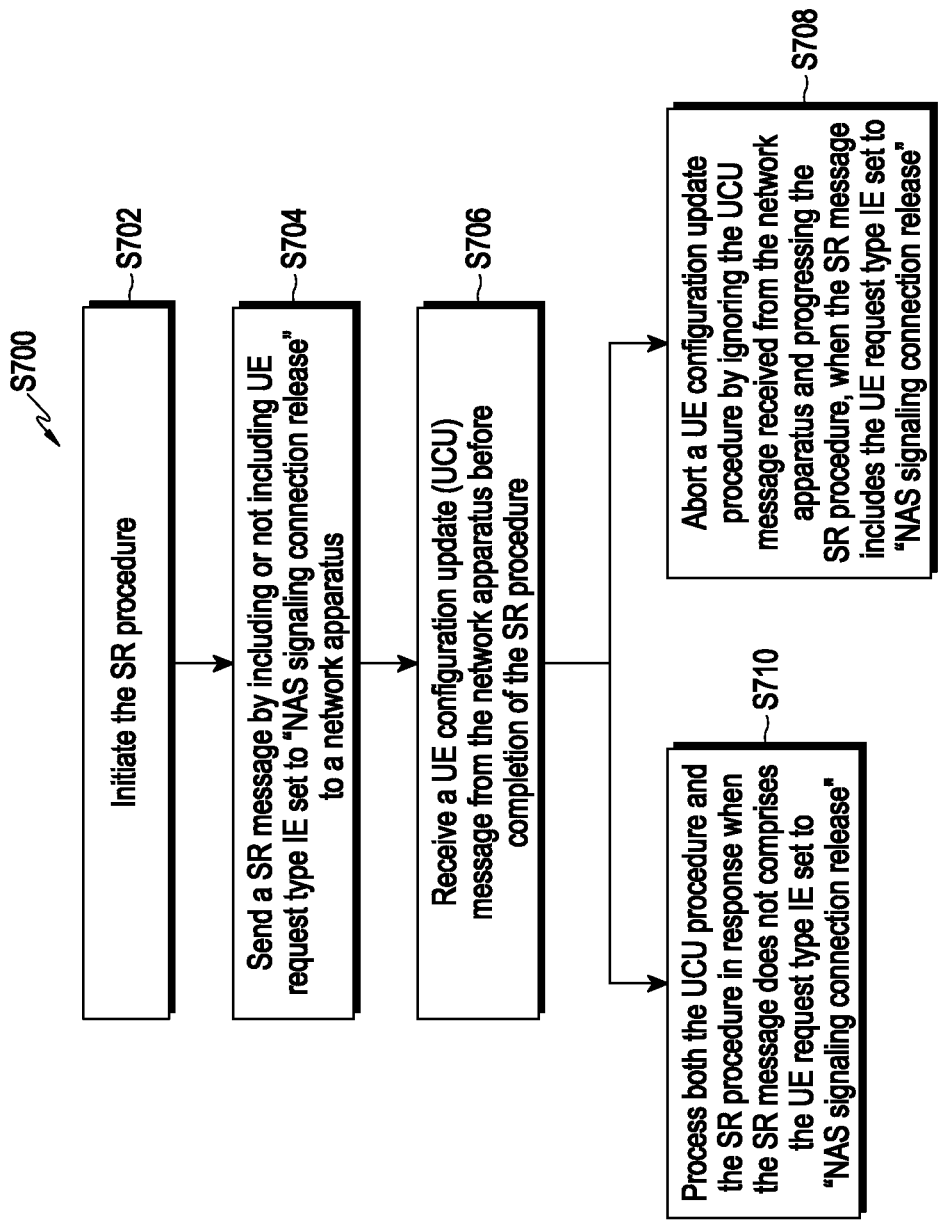
FIG. 7 is a flow chart illustrating a method, implemented by MUSIM UE, for handling an SR procedure in a wireless network, according to an embodiment of the disclosure.

FIG. 7 is a flow chart illustrating a method, implemented by a MUSIM UE, for handling an SR procedure in a wireless network, according to an embodiment of the disclosure.

Referring to FIG. 7, in a method S700, operations S702-S710 are handled by the SR procedure controller 140.

At operation S702, the method includes initiating the SR procedure. At operation S704, the method includes transmitting the SR message by including or not including UE request type IE set to "NAS signaling connection release" to the network apparatus 400. At operation S706, the method includes receiving the UCU message from the network apparatus 400 before completion of the SR procedure.

At operation S708, the method includes aborting the UE configuration update procedure by ignoring the UCU message received from the network apparatus 400 and progressing the SR procedure, when the SR message includes the UE request type IE set to "NAS signaling connection release". At operation S710, the method includes processing both the UCU procedure and the SR procedure in response when the SR message does not comprise the UE request type IE set to "NAS signaling connection release.

Figure 8:
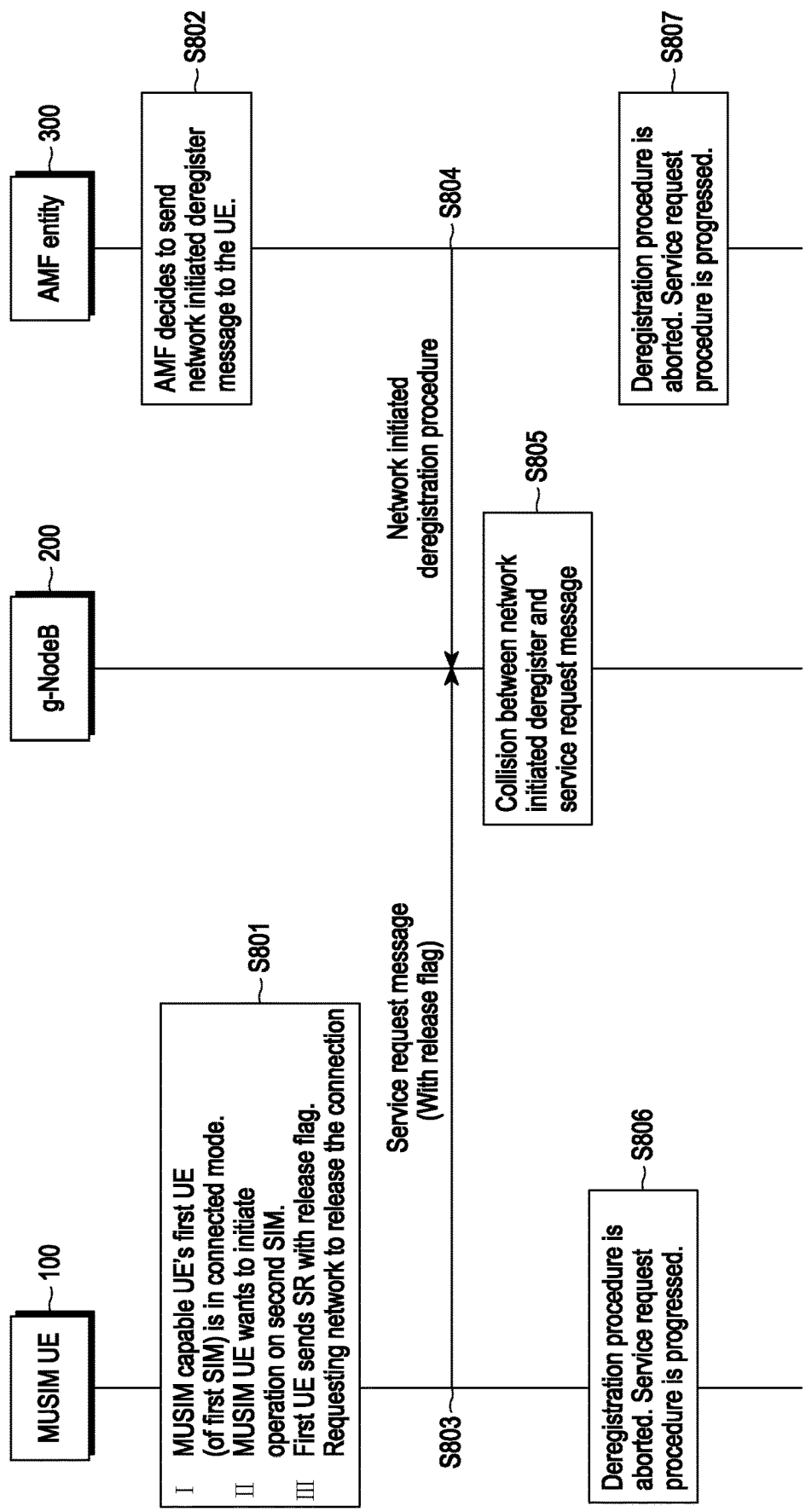
FIG. 8 is an example in which a service request and a de-registration procedure collision is depicted, according to an embodiment of the disclosure.

FIG. 8 is an example scenario in which a service request and de-registration procedure collision is depicted, according to an embodiment of the disclosure.

Referring to FIG. 8, unlike to the methods and systems of the related art, the following operations: operation S801, i) The MUSIM capable UE's first UE (belonging to first SIM) is in Connected Mode, ii) MUSIM UE 100 wants to initiate operation on second SIM, iii) the First UE transmits SR with release flag. Requesting network to release the connection and move the UE to either IDLE mode or INACTIVE state.

At operation S802, the AMF entity 300 decides to send the network initiated deregister message to the MUSIM UE 100. At operation S803, the MUSIM UE 100 transmits the service request message (with release flag) to the g-NodeB 200. At operation S804, the network apparatus initiated the deregistration procedure. At operation S805, the collision between the network initiated deregister and the service request message occurs. At operation S806, the deregistration procedure is aborted at the MUSIM UE 100 and the service request procedure is progressed at the MUSIM UE 100. At operation S807, the deregistration procedure is aborted at the AMF entity 300 and the service request procedure is progressed at the AMF entity 300.

The UE and network apparatus 400 shall abort the network initiated deregistration procedure and proceed with service request procedure, so that UE can get the release and move to either an IDLE state or an INACTIVE state and it can start the required operation/service on the second SIM as quickly as possible.

In yet another embodiment, the UE and the network apparatus 400 shall abort the network initiated deregistration procedure and progress with SR procedure with release flag if the network apparatus 400 initiated deregistration procedure does not indicate the same access type on which service request was transmitted. For example, if the service request is transmitted on 3GPP access and network initiated deregistration procedure only indicates non-3GPP access type then network initiated deregistration procedure should be aborted and service request procedure should be progressed.

In yet another embodiment, the UE and the network apparatus 400 shall progress the network initiated deregistration procedure and abort the service request with release flag if the network apparatus 400 initiated deregistration procedure does not indicate the same access type on which service request was transmitted. For example, if the service request message is transmitted on 3GPP access and network initiated deregistration procedure only indicates non-3GPP access type then network initiated deregistration procedure should be aborted and service request procedure should be progressed.

In yet another embodiment, the UE and the network apparatus 400 shall progress the network initiated deregistration procedure and also progress with service request procedure optionally if the access type in the deregistration message and access over which the service request message is transmitted is the same, so that the UE can get the release and move to either IDLE state or INACTIVE state and it may start the required operation/service on the second SIM.

Figure 9:
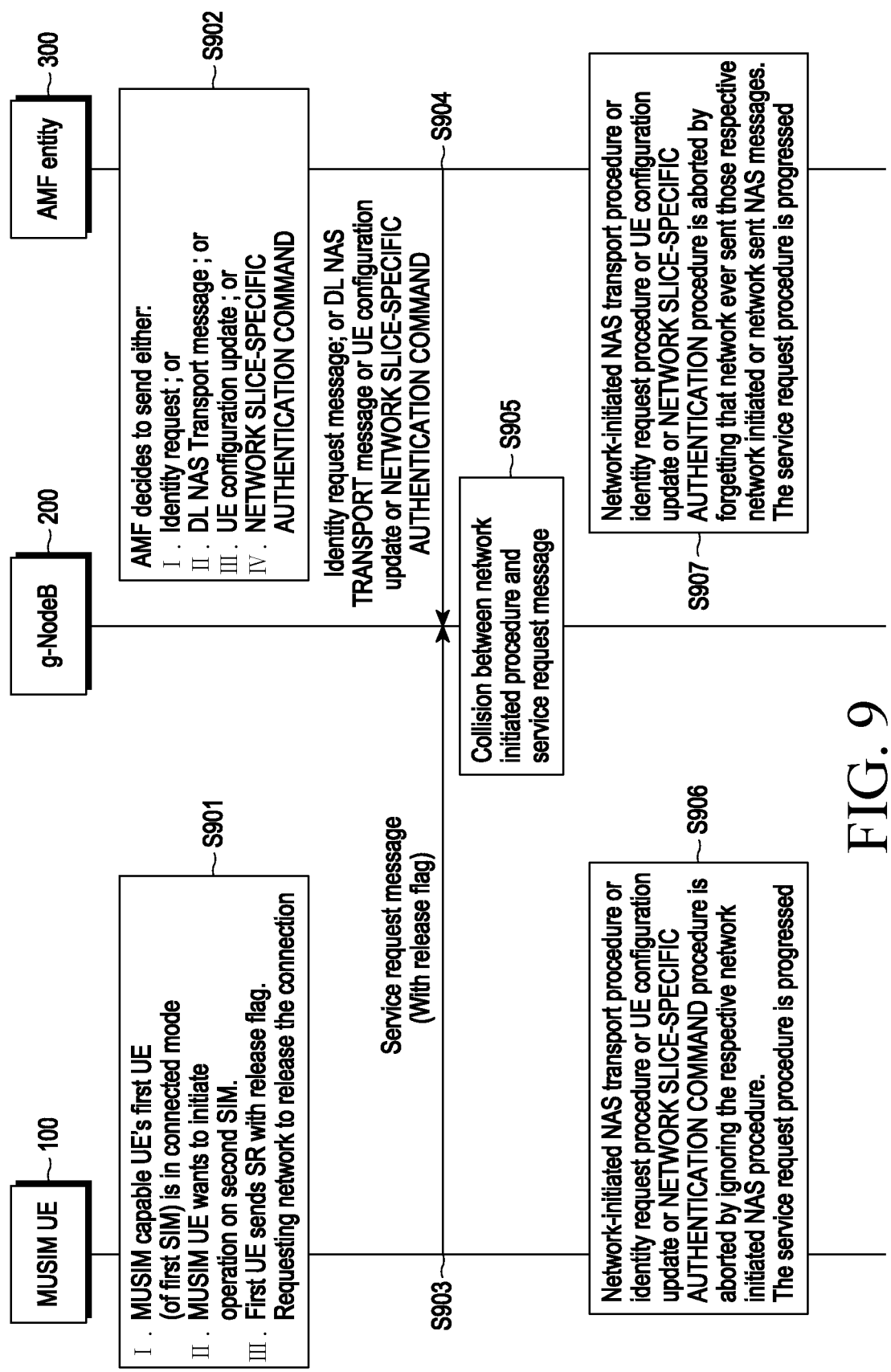
FIG. 9 is an example scenario in which a service request and identification procedure is depicted, according to an embodiment of the disclosure.

FIG. 9 is an example scenario in which a service request and a network initiated NAS procedure is depicted, according to of the disclosure embodiment of the disclosure.

Unlike to the methods and systems of the related art, referring to the FIG. 9, consider a proposed method, provides collision of service request and NAS procedures like identification procedure/DL NAS TRANSPORT procedure/Generic UE configuration update procedure/Network slice-specific authentication and authorization procedure. Followings are the operations: operation S901, MUSIM capable UE's first UE (belonging to first SIM) is in Connected Mode, ii) MUSIM UE wants to initiate operation on second SIM, iii) First UE transmits SR with release flag. At operation S902, requesting network to release the connection and now if the UE receives identify request message or DL NAS transport message or CONFIGURATION UPDATE COMMAND message or NETWORK SLICE-SPECIFIC AUTHENTICATION COMMAND message for processing.

At operation S903, the MUSIM UE 100 transmits the service Request message (With Release Flag) to the AMF. At operation S904, the AMF entity 300 transmits the identity request message, the DL NAS TRANSPORT message, the UE configuration update or the NETWORK SLICE-SPECIFIC AUTHENTICATION COMMAND towards the UE. At operation S905, the collision between the network initiated procedure and the service request message is detected by the UE and the AMF. At operation S906, the network-initiated NAS transport procedure or identity request procedure or UE configuration update or NETWORK SLICE-SPECIFIC AUTHENTICATION COMMAND procedure is aborted by ignoring the respective network initiated NAS procedure. The service request procedure is progressed. At operation S907, the network-initiated NAS transport procedure or identify request procedure or UE configuration update or NETWORK SLICE-SPECIFIC AUTHENTICATION procedure is aborted by forgetting that network ever transmitted those respective network initiated or network transmitted NAS messages. The service request procedure is progressed.

At both the UE and the network apparatus 400, the network apparatus 400 initiated the NAS transport procedure, identity request procedure, the CONFIGURATION UPDATE COMMAND or Network slice-specific authentication and authorization procedure is aborted. Service request procedure is progressed.

In yet another embodiment, if the downlink NAS message (for example DL NAS TRANSPORT message due to network-initiated NAS transport procedure or CONFIGURATION UPDATE COMMAND message due to Generic UE configuration update procedure) does not require UE to transmit the response message (for example in this case UL NAS TRANSPORT message or CONFIGURATION UPDATE COMPLETE or the registration request message) due to no acknowledgement is requested in the DL NAS TRANSPORT message or CONFIGURATION UPDATE COMMAND message or registration requested bit is not set. Then the UE and the network shall continue with both the procedures.

For example, when the SOR TRANSPARENT CONTAINER or the UE parameters update transparent container is received with ACK bit set (i.e. acknowledgement is requested) then only Service request procedure is progressed and network-initiated NAS transport procedure is aborted. Otherwise, when ACK bit is not set (i.e., no acknowledgement is requested) then both the procedures are progressed.

In yet another embodiment, at both the UE and the network, network-initiated NAS transport procedure or Identify request procedure or Network slice-specific authentication and authorization procedure shall be progressed and the Service request procedure is also progressed. So that required configuration in the MUSIM UE 100 can be received before UE can be released to IDLE or INACTIVE state (i.e., 5GMM-CONNECTED mode with RRC inactive indication). In yet another embodiment, this step can be done irrespective of whether the MUSIM UE 100 has set the Release request flag in the service request message.

At both, the MUSIM UE 100 and the network apparatus 400: The network apparatus 400 initiated downlink NAS TRANSPORT message can be aborted (also called as ignored in this embodiment) and Service request procedure with release flag can be progressed if:

Network-initiated NAS transport procedure is to provide
   a transport for one or more of the:
a single 5GSM message;
SMS;
an LPP message;
an SOR transparent container;
a single uplink 5GSM message which was not forwarded
   due to routing failure;
a single uplink 5GSM message which was not forwarded
   due to congestion control;
a UE policy container;
a single uplink 5GSM message which was not forwarded,
   because the PLMN's maximum number of PDU sessions has been reached;

a single uplink 5GSM message which was not forwarded, because the maximum number of PDU sessions with active user-plane resources has been reached;
a single uplink 5GSM message which was not forwarded, because of ongoing network slice-specific authentication and authorization procedure for the S-NSSAI that is requested;
a single uplink 5GSM message which was not forwarded due to service area restrictions;
UE parameters update transparent container;
a location services message;
a CIoT user data container;
a single uplink CIoT user data container or control plane user data which was not forwarded due to routing failure;
a single uplink CIoT user data container which was not forwarded due to congestion control; or
multiple of the above types.

At both, UE and Network: The generic UE configuration update procedure can be aborted and Service request procedure with release flag can be progressed if, following parameters are transmitted by the generic UE configuration update procedure optionally without the need to request the UE to perform the registration procedure for mobility and periodic registration update:
  a) 5G-GUTI;
  b) TAI list;
  c) Service area list;
  d) Network identity and time zone information (Full name for network, short name for network, local time zone, universal time and local time zone, network daylight saving time);
  e) LADN information;
  f) Rejected NSSAI;
  g) void;
  h) Operator-defined access category definitions;
  i) SMS indication;
  j) Service gap time value;
  k) "CAG information list";
  l) UE radio capability ID;
  m) 5GS registration result; and
  n) Truncated 5G-S-TMSI configuration.

Optionally, the following parameters can be transmitted to the UE with or without a request to perform the registration procedure for mobility and periodic registration update:
  a) Allowed NSSAI;
  b) Configured NSSAI; or
  c) Network slicing subscription change indication.

Optionally, the following parameters are transmitted to the UE with a request to perform the registration procedure for mobility and periodic registration update:
  a) MICO indication;
  b) UE radio capability ID deletion indication; and
  c) Additional configuration indication.

The abort in this disclosure means that respective message (either incoming message or outgoing message) on the UE side and the network side is ignored. For example, CUC procedure is aborted means UE ignores/also called as aborted the received CUC message and network ignores/aborts the transmitted (outgoing) CUC message.

Figure 10:
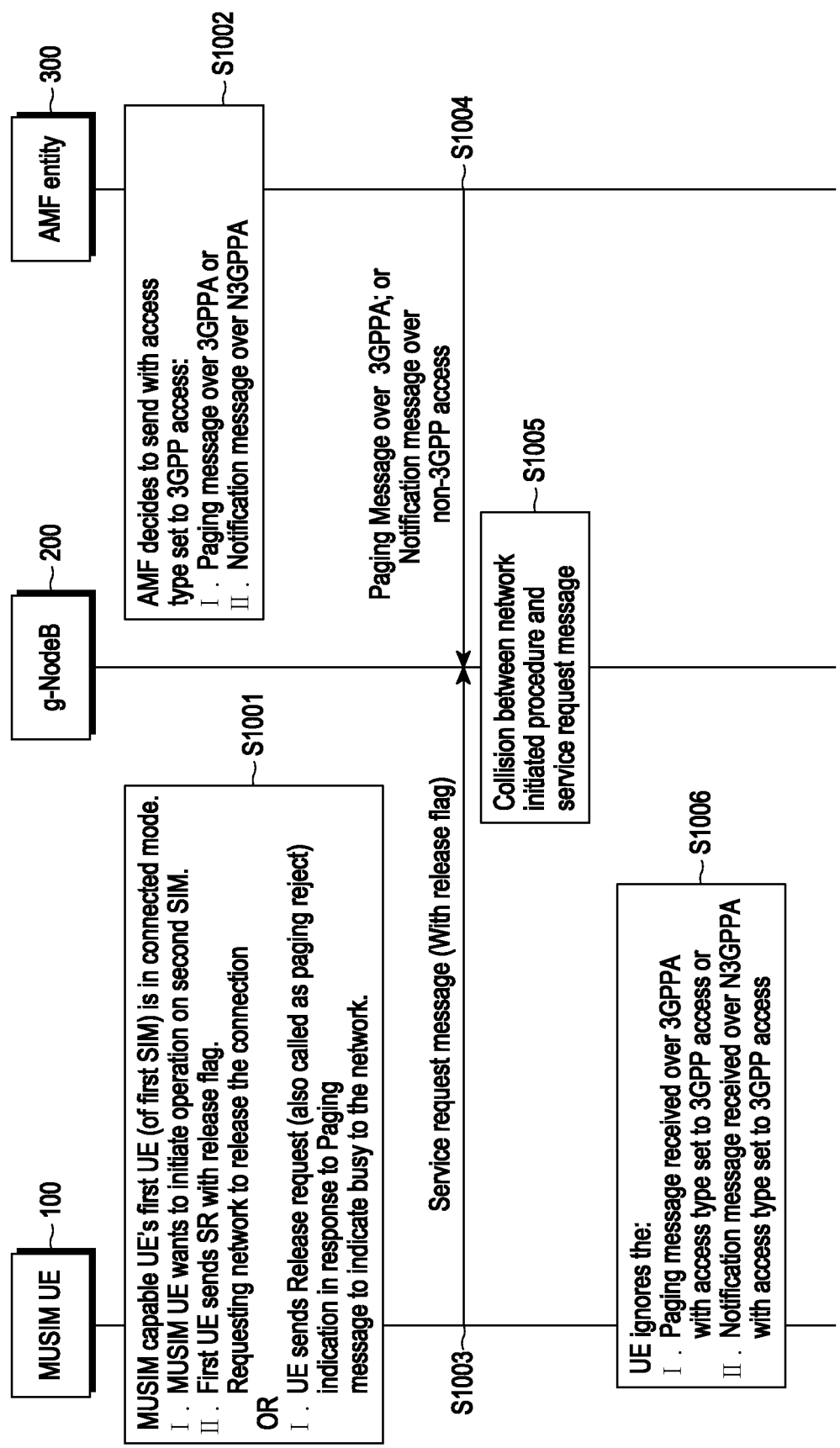
FIG. 10 is an example scenario in which a paging procedure and service request procedure collision is depicted, according to an embodiment of the disclosure.

FIG. 10 is an example scenario in which a paging procedure and service request procedure collision, according to an embodiment of the disclosure.

Referring to the FIG. 10 consider methods and systems, the paging procedure and service request procedure collision are as follows: operation S1001, i) MUSIM capable UE's first UE (of first SIM) is in Connected Mode, ii) MUSIM UE wants to initiate operation on second SIM, iii) First UE transmits SR with release flag. Requesting network to release the connection, OR iv) The UE transmits Release request (also called as Paging reject) indication in response to Paging message to indicate busy to the network.

At operation S1002, the AMF entity 300 decides to transmit with access type set to 3GPP access (Paging message over 3GPPA or Notification message over N3GPPA). At operation S1003, the MUSIM UE 100 transmits the service Request message (With Release Flag) to the g-NodeB 200. At operation S1004, the AMF entity 300 transmits the paging message over 3GPPA or Notification message over non-3GPP access to the g-NodeB 200. At operation S1005, the g-NodeB 200 detects the collision between network initiated procedure and service request message. At operation S1006, the MUSIM UE 100 ignores the i) paging message received over 3GPPA with access type set to 3GPP access or ii) notification message received over N3GPPA with access type set to 3GPP access.

At the same time while the service request procedure is ongoing, the MUSIM UE 100 receives the Paging message over 3GPP access or Notification message over non-3GPP access (with access type set to non-3GPP access).

As per the methods of the related art, received paging message or notification message over non-3GPP access is ignored by the MUSIM UE 100. But, if the received Paging message or Notification message is for some other Paging cause (or incoming service) like for example earlier transmitted Service request (SR) was Paging cause non-voice which is indicated to the UE with empty paging cause or with paging cause others. Now this is second Paging message with different Paging cause for example voice. Then if the UE ignores the received Paging message, then the UE will lose the incoming service.

Unlike to the methods and systems of the related art, when paging message over 3GPP access or notification message over non-3GPP access is received:
The UE shall check the reason why service request is ongoing.

If the UE transmitted the first Service request (or any other NAS message) in response to first Paging message or first Notification message and now the second Paging message or second notification message is received by the UE and this second Paging/Notification message contains a different paging cause or access type (in general contents are different in Paging/Notification message) or indicates different incoming (downlink) service is pending for the UE—or—if the conditions in the MUSIM UE has changed then MUSIM UE may re-initiate the service request (or any other NAS) procedure again after the completion of the current ongoing service request (or any other NAS procedure) or the specific procedure to receive the incoming service (or downlink data or signaling) from the network due to second Paging message or second notification message.

If the UE transmitted the Service request (with release request flag) and now the Paging message or notification message is received by the UE and this Paging/Notification message contains a paging cause or indicates incoming (downlink) service is pending for the UE—or—if the conditions in the MUSIM UE has changed, then MUSIM UE may re-initiate the service request procedure again after the completion of the current ongoing service request or the specific procedure to receive the incoming service (or downlink data or signaling) from the network due to Paging message or Notification message (over non-3GPP access). In other words, the UE will not ignore the received Paging message over 3GPP access or Notification message received over non-3GPP access and the UE will respond back with appropriate NAS message. The paging message here is transmitted over 3GPP access and Notification message is transmitted over non-3GPP access to indicate to the UE that data or signaling is pending to be received for the UE over 3GPP access.

In some embodiment of the disclosure, when UE is executing leaving procedure by triggering SR with NAS signalling connection release procedure if there is a collision with UCU procedure then it's not clear if network will release the NAS signalling connection or wait for UE to send the response message like CUC response or registration procedure based on indication in the CUC message. Given that UE has decided to leave the current network it is proposed that leaving procedure takes precedence so that there is no delay in execution of leaving procedure and as a consequence less delay in initiating the services on alternate SIM.

If UE triggers SR with NAS signalling connection release and if there is a collision with UCU procedure. UCU procedure is aborted and SR procedure is progressed.

Leaving procedure from the UE may be delayed. If CUC indicates to perform registration then UE will end up executing the registration procedure due to which there will be delay in starting service on another SIM.

In abnormal cases in the UE, The following abnormal cases can be identified:
 a) Transmission failure of the CONFIGURATION UPDATE COMPLETE message with TAI change from lower layers
  If the current TAI is not in the TAI list, the generic UE configuration update procedure shall be aborted and a registration procedure for mobility and periodic registration update shall be initiated.
  If the current TAI is still part of the TAI list, it is up to the UE implementation how to re-run the ongoing procedure that triggered the generic UE configuration update procedure.
 b) Transmission failure of CONFIGURATION UPDATE COMPLETE message indication without TAI change from lower layers
  It is up to the UE implementation how to re-run the ongoing procedure that triggered the generic UE configuration update procedure.
 c) Generic UE configuration update and de-registration procedure collision
  If the UE receives CONFIGURATION UPDATE COMMAND message after sending a DEREGISTRATION REQUEST message and the access type included in the DEREGISTRATION REQUEST message is same as the access in which the CONFIGURATION UPDATE COMMAND message is received, then the UE shall ignore the CONFIGURATION UPDATE COMMAND message and proceed with the de-registration procedure. Otherwise, the UE shall proceed with both the procedures.
 d) Void
 e) Generic UE configuration update and service request procedure collision
  If the SERVICE REQUEST message does not include UE request type IE with Request type value set to "NAS signalling connection release" and the UE receives a CONFIGURATION UPDATE COMMAND message before the ongoing service request procedure has been completed, the UE shall proceed with both the procedures.
  If the SERVICE REQUEST message includes UE request type IE with Request type value set to "NAS signalling connection release" and the UE receives a CONFIGURATION UPDATE COMMAND message before the ongoing service request procedure has been completed, the UE shall ignore the CONFIGURATION UPDATE COMMAND message and proceed with the service request procedure.
 f) "CAG information list" is received and the UE is operating in SNPN access operation mode
  If the UE receives the CAG information list IE in the CONFIGURATION UPDATE COMMAND message and the UE is operating in SNPN access operation mode, the UE shall ignore the content of CAG information list IE.

In abnormal cases on the network side, The following abnormal cases can be identified:
 a) Expiry of timer T3555.
  The network shall, on the first expiry of the timer T3555, retransmit the CONFIGURATION UPDATE COMMAND message and shall reset and start timer T3555. This retransmission is repeated four times, i.e. on the fifth expiry of timer T3555, the procedure shall be aborted. In addition, if the CONFIGURATION UPDATE COMMAND message includes the 5G-GUTI IE, the network shall behave as described in case b)-1) below.
 b) Lower layer failure.
  If a lower layer failure is detected before the CONFIGURATION UPDATE COMPLETE message is received and:
 1) if the CONFIGURATION UPDATE COMMAND message includes the 5G-GUTI IE, the old and the new 5G-GUTI shall be considered as valid until the old 5G-GUTI can be considered as invalid by the AMF. If a new TAI list was provided in the CONFIGURATION UPDATE COMMAND message, the old and new TAI list shall also be considered as valid until the old TAI list can be considered as invalid by the AMF.
  During this period the AMF:
 i) may first use the old 5G-S-TMSI from the old 5G-GUTI for paging within the area defined by the old TAI list for an implementation dependent number of paging attempts for network originated transactions. If a new TAI list was provided in the CONFIGURATION UPDATE COMMAND message, the new TAI list should also be used for paging. Upon response from the UE, the AMF may re-initiate the CONFIGURATION UPDATE COMMAND. If the response is received from a tracking area within the old and new TAI list, the network shall re-initiate the CONFIGURATION UPDATE COMMAND message. If no response is received to the paging attempts, the network may use the new 5G-S-TMSI from the new 5G-GUTI for paging for an implementation dependent number of paging attempts. In this case, if a new TAI list was provided with new 5G-GUTI in the CONFIGURATION UPDATE COMMAND message, the new TAI list shall be used instead of the old TAI list. Upon response from the UE the AMF shall consider the new 5G-GUTI as valid and the old 5G-GUTI as invalid.
 ii) shall consider the new 5G-GUTI as valid if it is used by the UE and, additionally, the new TAI list as valid if it was provided with this 5G-GUTI in the CONFIGURATION UPDATE COMMAND message; and iii) may use the identification procedure followed by a new generic UE configuration update procedure if the UE uses the old 5G-GUTI; or
2) if the CONFIGURATION UPDATE COMMAND message does not include the 5G-GUTI IE and:
  i) the CONFIGURATION UPDATE COMMAND message does not contain the Allowed NSSAI IE, the Rejected NSSAI IE, or the Extended rejected NSSAI IE, the network shall abort the procedure; or
  ii) the CONFIGURATION UPDATE COMMAND message contains the Allowed NSSAI IE, the Rejected NSSAI IE, or the Extended rejected NSSAI IE, the network shall either abort the procedure or retransmit the CONFIGURATION UPDATE COMMAND message on expiry of the timer T3555. The retransmission shall not be repeated more than four times. If the retransmission is repeated for four times, the network shall abort the procedure.
c) Generic UE configuration update and UE initiated de-registration procedure collision.
  If the network receives a DEREGISTRATION REQUEST message before the ongoing generic UE configuration update procedure has been completed, the network shall abort the generic UE configuration update procedure and shall progress the de-registration procedure.
d) Generic UE configuration update and registration procedure for mobility and periodic registration update collision
  If the network receives a REGISTRATION REQUEST message before the ongoing generic UE configuration update procedure has been completed, the network shall abort the generic UE configuration update procedure and shall progress the registration procedure for mobility and periodic registration update procedure.
e) Generic UE configuration update and service request procedure collision
  If the network receives a SERVICE REQUEST message before the ongoing generic UE configuration update procedure has been completed and the SERVICE REQUEST message does not include UE request type IE with Request type value set to "NAS signalling connection release", both the procedures shall be progressed.

If the network receives a SERVICE REQUEST message before the ongoing generic UE configuration update procedure has been completed and the SERVICE REQUEST message includes UE request type IE with Request type value set to "NAS signalling connection release", the network shall abort the generic UE configuration update procedure and shall progress the service request procedure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network entity in a wireless network, the method comprising:
  initiating a user equipment (UE) configuration update (UCU) procedure;
  receiving, from a UE, a service request (SR) message;
  aborting the UCU procedure and progressing an SR procedure, in case that the SR message is received before completion of the UCU procedure and that the SR message includes UE request type information set to a value indicating non-access stratum (NAS) signaling connection release; and
  progressing both the UCU procedure and the SR procedure, in case that the SR message is received before the completion of the UCU procedure and that the SR message does not include the UE request type information.

2. The method of claim 1, wherein the UE is a multi-subscriber identity module (SIM) (MUSIM) UE.

3. The method of claim 1, wherein the SR message includes a flag indicating to release connection.

4. A method performed by a user equipment (UE) in a wireless network, the method comprising:
  transmitting, to a network entity, a service request (SR) message;
  receiving, from the network entity, a configuration update command message;
  ignoring the configuration update command message and proceeding with an SR procedure, in case that the SR message includes UE request type information set to a value indicating non-access stratum (NAS) signaling connection release and that the configuration update command message is received before completion of the SR procedure; and
  proceeding with both a UE configuration update (UCU) procedure and the SR procedure, in case that the SR message does not include the UE request type information and that the configuration update command message is received before the completion of the SR procedure.

5. The method of claim 4, wherein the UE is a multi-subscriber identity module (SIM) (MUSIM) UE.

6. The method of claim 4, wherein the SR message includes a flag indicating to release connection.

7. The method of claim 4, in case that a collision between a network initiated deregister message and the SR message occurs, further comprising:
  aborting a deregister procedure.

8. A network entity in a wireless network, the network entity comprising:
  a transceiver; and
  at least one processor communicatively connected to the transceiver,
  wherein the at least one processor is configured to:
    initiate a user equipment (UE) configuration update (UCU) procedure,
    receive, from a UE, a service request (SR) message,
    abort the UCU procedure and progress an SR procedure, in case the SR message is received before completion of the UCU procedure and that the SR message includes UE request type information set to a value indicating non-access status (NAS) signaling connection release; and progress both the UCU procedure and the SR procedure, in case that the SR message is received before the completion of the UCU procedure and that the SR message does not include the UE request type information.

9. The network entity of claim 8, wherein the UE is a multi-subscriber identity module (SIM) (MUSIM) UE.

10. The network entity of claim 8, wherein the SR message includes a flag indicating to release connection.

11. A user equipment (UE) in a wireless network, the UE comprising:
a transceiver; and
at least one processor, communicatively connected to the transceiver,
wherein the at least one processor is configured to:
transmit, to a network entity, a service request (SR) message,
receive, from the network entity, a configuration update command message,
ignore the configuration update command message and proceed with an SR procedure, in case that the SR message includes UE request type information set to a value indicating non-access stratum (NAS) signaling connection release and that the configuration update command message is received before completion of the SR procedure, and
proceed with both a UE configuration update (UCU) procedure and the SR procedure, in case that the SR message does not include the UE request type information and that the configuration update command message is received before the completion of the SR procedure.

12. The UE of claim 11, wherein the UE is a multi-subscriber identity module (SIM) (MUSIM) UE.

13. The UE of claim 11, wherein the SR message includes a flag indicating to release connection.

14. The UE of claim 11, wherein, in case that a collision between a network initiated deregister message and the SR message occurs, the at least one processor is further configured to abort a deregister procedure.

* * * * *